United States Patent
Shirata et al.

(10) Patent No.: US 7,651,782 B2
(45) Date of Patent: Jan. 26, 2010

(54) METHOD FOR PRODUCING METALLIC NANOPARTICLES, METALLIC NANOPARTICLES, AND DISPERSION OF THE SAME

(75) Inventors: Masashi Shirata, Kanagawa (JP); Hiroyuki Hirai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 290 days.

(21) Appl. No.: 11/774,720

(22) Filed: Jul. 9, 2007

(65) Prior Publication Data
US 2008/0011125 A1   Jan. 17, 2008

(30) Foreign Application Priority Data
Jul. 11, 2006   (JP) ............................. 2006-190280

(51) Int. Cl.
*B22F 9/24* (2006.01)
(52) U.S. Cl. ............................. 428/548; 75/255; 516/33
(58) Field of Classification Search ........................ None
See application file for complete search history.

(56) References Cited

U.S. PATENT DOCUMENTS 6,783,569 B2 * 8/2004 Cheon et al. .................. 75/348

2007/0134491 A1 * 6/2007 Atsuki et al. ................ 428/402
2007/0212562 A1 * 9/2007 Shim et al.

FOREIGN PATENT DOCUMENTS

| JP | 61000055562 B2 | 11/1986 |
| JP | 2638271 B2 | 4/1997 |
| JP | 20020299833 A | 10/2002 |
| JP | 2004-256857 A | 9/2004 |

* cited by examiner

*Primary Examiner*—George Wyszomierski
(74) *Attorney, Agent, or Firm*—Sughrue Mion, PLLC

(57) ABSTRACT

The present invention provides a method for producing metallic nanoparticles, which includes reacting a copper compound with a hydrazine reducing agent in an organic solvent in the presence of a precious metal compound, wherein the precious metal compound is a compound containing at least one precious metal selected from the group consisting of platinum, gold, silver, and palladium, and the total number of precious metal atoms in the precious metal compound is in the range of 1 to 10 at. % of the total copper atoms in the copper compound.

4 Claims, No Drawings

METHOD FOR PRODUCING METALLIC NANOPARTICLES, METALLIC NANOPARTICLES, AND DISPERSION OF THE SAME

CROSS-REFERENCE TO RELATED APPLICATION

This application claims priority under 35 USC 119 from Japanese Patent Application No. 2006-190280, the disclosure of which is incorporated by reference herein.

BACKGROUND OF THE INVENTION

1. Field of the Invention

The present invention relates to a method for producing metallic nanoparticles suitable for forming printed circuits and internal electrodes of multilayer ceramic capacitors, metallic nanoparticle produced by the method, and a dispersion containing the metallic nanoparticles.

2. Description of the Related Art

As a method for quickly forming a fine conductive pattern on a substrate, a method in which a dispersion liquid of gold or silver nanoparticles is discharged using an ink jet, dispenser, or other device to form a conductive pattern of gold or silver is known (e.g., see Japanese Patent Application Laid-Open (JP-A) No. 2002-299833). However, gold and silver are so expensive that they are not suitable for low cost production. On the other hand, copper is a low-cost material having favorable electric conductivity, and is widely used as a material for, for example, circuit members of printed wiring boards, various electrical contact members, and electrode members of capacitors. With the recent miniaturization of electronic devices, formation of multilayer circuits with a higher density, and small-size and large-capacity multilayer ceramic capacitors are required. In order to form fine conductive patterns and thin film electrodes, there is a need for a dispersion of copper nanoparticles that is easy to handle.

Examples of known methods for producing copper fine particles include a method of reducing copper oxide using a hydrazine reducing agent in an aqueous solution containing a protective colloid such as gum arabic (e.g., see Japanese Patent Application Publication (JP-B) No. 61-55562), a method of reducing copper hydroxide at a pH of greater than 12 using a reducing sugar to form cuprous oxide, and then reducing the cuprous oxide at a temperature of 50° C. or higher using a hydrazine reducing agent (e.g., see Japanese Patent No. 2638271), and a method of reacting copper oxide with a reducing agent in an aqueous solvent in the presence of a sulfur compound and a protective colloid (e.g., see JP-A No. 2004-256857).

Copper fine particles produced by these methods may be mixed with a binder such as an epoxy resin to make a paste or paint, which is printed or applied onto a substrate. The pastes or paints may be layered as necessary. The substrate having thereon a paste or paint layer is heated and burned to form an electric circuit or electrode.

However, the copper fine particles produced by the above-described method have a large average particle size of 0.05 to 1 μm, and thus are not suitable for forming a fine circuit of several tens of μm or less. In addition, the particles require a sintering process at high temperatures. Therefore, there is a need for copper fine particles having a smaller particle size.

SUMMARY OF THE INVENTION

A first aspect of the invention provides a method for producing metallic nanoparticles, including reacting a copper-containing compound with a hydrazine reducing agent in an organic solvent in the presence of a precious metal compound, wherein the precious metal compound is a compound containing at least one precious metal selected from the group consisting of platinum, gold, silver, and palladium, and the total number of precious metal atoms in the precious metal compound is in the range of 1 to 10 at. % of the total number of copper atoms in the copper-containing compound.

A second aspect of the invention provides metallic nanoparticles produced by the method of the first aspect.

A third aspect of the invention provides a dispersion of metallic nanoparticles comprising the metallic nanoparticles of the second aspect and an organic solvent.

DETAILED DESCRIPTION OF THE INVENTION

The invention provides a method for producing metallic nanoparticles, containing reacting a copper-containing compound with a hydrazine reducing agent in an organic solvent in the presence of a precious metal compound, wherein the precious metal compound is a compound containing at least one precious metal selected from the group consisting of platinum, gold, silver, and palladium, and the total number of precious metal atoms in the precious metal compound is in the range of 1 to 10 at. % of the total number of copper atoms in the copper-containing compound.

By including the above-described reacting, metallic nanoparticles having an average particle diameter of 1 to 50 nm may be produced. The average particle diameter of the metallic nanoparticles may be determined on the basis of the arithmetic average of the diameter of each of 500 particles that is measured with an electron microscope under an accelerating voltage of 200 kV.

Further, according to the producing method of the invention, metallic nanoparticles having excellent dispersibility and a uniform particle shape are produced, and a metallic nanoparticles dispersion containing the metallic nanoparticles is obtained. A low-resistance conductive pattern is obtained by printing or applying the metallic nanoparticle dispersion onto a plastic substrate such as a polyimide substrate, followed by firing at a temperature of 300° C. or lower. Further, the metallic nanoparticle dispersion provides excellent handling property and adhesiveness to the substrate, and hence, is useful for on-demand formation of a fine conductive pattern on a substrate at a low cost using an ink jet printer or a dispenser.

(A) Copper Oxide and Copper Hydroxide

In the method for producing metallic nanoparticles according to the invention, the above-described copper-containing compound (hereinafter referred to as copper compound) preferably contains at least one selected from copper oxide and copper hydroxide.

The copper oxide in the invention refers to cuprous oxide (copper I oxide) or cupric oxide (copper II oxide). The copper hydroxide refers to a hydrous oxide, hydroxide, and basic carbonate of copper. Among these copper compounds, inexpensive ones which leave no residue are particularly preferable. The residue means a constituent which is not reduced to metallic copper by the producing method of the invention. Preferable examples of the copper compound in the invention include cuprous oxide, cupric oxide, copper hydroxide, and hydrates thereof. The method for producing the copper compound is not particularly limited. The copper compound may be industrially produced by, for example, an electrolytic process, a heating oxidation process, a heat decomposition process, or a wet process. In the invention, the particle diameter of the copper compound is preferably as small as possible, and is, for example, 10 μm or less, preferably 1 μm or less, and further preferably 100 nm or less. Further, the copper compound in the invention is preferably not dissolved but dispersed as particles in the organic solvent to be used.

The copper compound in the invention may be a commercial product, or newly synthesized for performing the method for producing the metallic nanoparticles according to the invention. In particular, it is preferable to use a copper compound newly synthesized for producing metallic nanoparticles. For example, in cases where cuprous oxide is used as the copper compound, the cuprous oxide is preferably synthesized by a wet process in which a solution of a divalent copper salt is reduced using a reducing agent. The types of the divalent copper salt and the solvent are not particularly limited as long as they make a solution at an intended concentration of copper ions. The divalent copper salt is preferably at least one selected from, for example, copper acetate, copper nitrate, copper sulfate, copper chloride, copper oxalate, and copper formate. Among them, copper acetate and copper formate are preferable, and copper acetate is most preferable.

The solvent used to synthesize the copper compound is preferably at least one solvent selected from organic solvents, water, acids, bases and mixtures thereof. Among them, an organic solvent is used preferably, and an "alcohol compound having within the molecule thereof an amino group" that will be described later is most preferable.

The reducing agent used to synthesize the copper compound may be selected as appropriate from common reducing agents according to the intended use. Examples of the reducing agent include alkali metal borohydrides such as sodium borohydride, hydrazine compounds, citric acid and salts thereof, succinic acid and salts thereof, ascorbic acid and salts thereof, amine compounds, diol compounds, and α-hydroxyketones. Among them, hydrazine compounds, amine compounds, diol compounds, and α-hydroxyketones are particularly preferable.

Examples of the amine compound include diethylhydroxylamine, dimethylhydroxylamine, triethylamine, butanolamine, propylamine, ethylenediamine, p-phenylenediamine, and aminophenol. Examples of the hydrazine compound include hydrazine and phenylhydrazine. Examples of the diol compound include hydroquinone, catechol, and ethylene glycol. Examples of the α-hydroxy ketone include hydroxyacetone and methylhydroxyacetone.

(B) Precious Metal Compound

The method for producing metallic nanoparticles according to the invention contains reacting the copper compound with a hydrazine reducing agent in the presence of a compound containing at least one precious metal selected from the group consisting of platinum, gold, silver, and palladium (hereinafter referred to as precious metal compound).

The precious metal in the invention is at least one selected from the group consisting of platinum, gold, silver, and palladium, and is preferably silver.

Examples of the precious metal compound in the invention include inorganic salts of precious metals, organic acid salts of precious metals, and precious metal complexes. Examples of the inorganic salts of precious metals include chlorides, sulfates, nitrates, phosphates, pyrophosphates, cyanides, and fluoroborates. Examples of the organic acid salts of precious metals include formates, acetates, succinates, malates, lactates, citrates, ascorbates, oxalates, benzoates, and vanillates. Examples of the precious metal complexes include amine complexes, halide complexes, and complexes with organic complexing agents. Among them, organic acid salts are preferable, acetates are more preferable, and silver acetate is still more preferable.

One of the precious metal compounds in the invention may be used alone or two or more of them can be used together.

In the reacting (reaction), the number of precious metal atoms in the precious metal compound is in the range of 1 to 10 at. %, preferably in the range of 2 to 8 at. %, and more preferably 4 to 6 at. % of the total number of copper atoms in the copper compound. When the total number of precious metal atoms in the precious metal compound is in the range of 1 to 10 at. % of the total number of copper atoms in the copper compound, this means the precious metal compound is added to the reaction system in such a manner that the number of total moles of precious metal atoms in the precious metal compound is in the range of 0.01 to 0.1 moles with reference to 1 mole of copper atoms in the copper compound. When the total number of precious metal atoms in the precious metal compound is within the above-described range, the average particle diameter of the obtained metallic nanoparticles falls within the range of 1 to 50 nm.

(C) Hydrazine Reducing Agent

The method for producing metallic nanoparticles according to the invention contains a reaction step of reacting the copper compound(s) with at least one hydrazine reducing agent.

The hydrazine reducing agent in the invention is not particularly limited as long as it is a hydrazino group-containing compound. Examples thereof include at least one compound selected from hydrazine, hydrazine hydrochloride, hydrazine sulfate, hydrazine hydrate, phenyl hydrazine, benzyl hydrazine, and ethyl hydrazine. Among them, hydrazine, hydrazine hydrate, and hydrazine hydrochloride are preferable, and hydrazine monohydrate is particularly preferably because it leaves no residue after the reaction with the copper compound, and is relatively safe. One of the hydrazine reducing agents in the invention may be used alone or two or more of them can be used together.

The usage of the hydrazine reducing agent is preferably in the range of 0.2 to 5 moles with reference to 1 mole of copper contained in the copper compound. When the hydrazine reducing agent is used in an amount of 0.2 mole or more, the reducing reaction toward copper is promoted, and thereby a sufficient amount of metallic nanoparticles is produced. Further, by limiting the usage to 5 moles or less, abrupt reaction is suppressed to reduce hazards during the reaction, and persistence of the hydrazine reducing agent in the produced metallic nanoparticles is suppressed. If the hydrazine reducing agent remains in the produced metallic nanoparticles, the hydrazine reducing agent gradually decomposes to make bubbles during storage of the metallic nanoparticles. The usage of the hydrazine reducing agent is more preferably in the range of 0.5 to 3 moles.

(D) Organic Solvent

In the method for producing metallic nanoparticles according to the invention, the above-described reaction is conducted in an organic solvent.

The organic solvent in the invention preferably contains at least one organic solvent having a boiling point of 60° C. to 260° C. Examples of such an organic solvent include, but are not limited to, alkane compounds (e.g., octane, nonane, decane, undecane, dodecane, tridecane, tetradecane, and cyclooctane), alkene compounds (e.g., 1-octene, 2-nonene, 1-decene, and 1-undecene), alkanol compounds (e.g., 1-octanol, 2-octanol, 1-nonanol, 1-decanol, and 4-methyl-1-cyclohexanol), alkylamine compounds (e.g., octylamine and decylamine), and ester compounds (e.g., N-amyl acetate, hexyl acetate, 2-ethylhexyl acetate, cyclohexyl acetate, butyl propionate, ethyl caprylate, and ethyl caprate). One of the organic solvents in the invention may be used alone or two or more of them can be used together.

In the invention, it is preferable that at least one low-boiling compound having a boiling point of about 60 to 120° C. be used in combination with at least one high-boiling compound having a boiling point of about 120 to 260° C. The combination of a low-boiling compound and a high-boiling compound decreases the concentration of the copper compound at the initiation of the reducing reaction, by which the reaction proceeds safely and moderately. Further, by removing the low-boiling compound by evaporation during the reaction, a highly concentrated dispersion of metallic nanoparticles is obtained at the completion of the reaction. In cases where a low-boiling compound is used in combination with a high-boiling compound, the volume ratio of the high-boiling compound to the low-boiling compound is preferably in the range of 1.0 to 3.0.

In the invention, the organic solvent(s) preferably contains a non-polar solvent. Since a non-polar solvent is poorly compatible with a hydrazine reducing agent and thus is hard to uniformly mix therewith, which decreases the probability of contact between the hydrazine reducing agent and the copper compound. In usual cases, reducing reaction using a hydrazine reducing agent involves heat generation and foaming. The reducing reaction proceeds safely by decreasing the probability of contact between the hydrazine reducing agent and the copper compound. Further, the diameter of the produced metallic nanoparticles is further decreased through the use of a non-polar solvent.

The non-polar solvent in the invention includes at least aromatic hydrocarbons such as toluene, benzene, and xylene, and alkane hydrocarbons such as octane, decane, hexane, and nonane.

Among the non-polar solvents, as the low-boiling compound, for example, toluene (boiling point: 110° C.), hexane (69° C.), and heptane (98° C.) are preferable. As the high-boiling compound, for example, octane (126° C.), nonane (151° C.), decane (174° C.), undecane (196° C.), dodecane (216° C.), tridecane (234° C.), and tetradecane (253° C.) are preferable.

It is more preferable that the non-polar solvent be contained in an amount of 10 to 100 vol % with reference to all the organic solvents.

(E) Alcohol Compound Having within Molecule thereof Amino Group

In the method for producing metallic nanoparticles according to the invention, the reaction step of reacting the copper compound with a hydrazine reducing agent is preferably conducted in the presence of at least one alcohol compound having within the molecule thereof at least one amino group (hereinafter may be referred to as "alcohol compound according to the invention").

The alcohol compound in the invention is capable of controlling the speed of the reaction between the copper compound and the hydrazine reducing agent, controlling the viscosity of the metallic nanoparticle dispersion, and serving as an antioxidant for copper during storage, printing, or burning after application of the metallic nanoparticle dispersion.

The alcohol compound in the invention preferably leaves less residues after heating and burning of the metallic nanoparticle dispersion of the invention, and is preferably volatile (subliming) or decomposed to have volatility. From the above viewpoints, the alcohol compound in the invention preferably has a boiling point of 120° C. to 250° C. Examples of such an alcohol compound in the invention include 2-dimethylaminoethanol, 2-diethylaminoethanol, 1-dimethylamino-2-propanol, 3-diethylamino-1-propanol, 2-dimethylamino-2-methyl-1-propanol, 2-(2-aminoethoxy)ethanol, 2-aminoethanol, diethanolamine, 2-amino-2-methyl-1-propanol, and 2-(2-aminoethylamino)ethanol.

The addition amount of the alcohol compound in the invention is not particularly limited, but is preferably in the range of 0.1 to 2 moles with reference to 1 mole of copper atoms contained in the copper compound.

Further, the alcohol compound in the invention may be used as a reducing agent in the synthesis of a copper compound such as copper oxide or copper hydroxide that may be used in the method for producing metallic nanoparticles according to the invention. In particular, in the synthesis of cuprous oxide, at least one selected from the group consisting of 2-dimethylaminoethanol, 2-diethylaminoethanol, 1-dimethylamino-2-propanol, and 3-diethylamino-1-propanol is preferably used.

(F) Organic Acid

In the method for producing metallic nanoparticles according to the invention, the reaction step of reacting the copper compound with a hydrazine reducing agent is preferably conducted in the presence of an organic acid.

The presence of an organic acid in the reaction step allows the control of the speed of the reaction between the copper compound and the hydrazine reducing agent, capture of hydrazine after the completion of the reaction, and improvement of dispersibility of the metallic nanoparticles. Further, the addition of the organic acid further decreases the particle diameter of the metallic nanoparticles.

The organic acid in the invention preferably has a low level of odor and leaves small amount of residues after heating and burning. For example, the organic acid is preferably a compound having 8 to 20 carbon atoms. Examples of the organic acid include saturated fatty acids (e.g., caprylic acid, capric acid, undecanoic acid, lauric acid, and stearic acid), mono-unsaturated fatty acid (e.g., myristoleic acid, palmitoleic acid, oleic acid, and elaidic acid), di-unsaturated fatty acids (e.g., linolic acid), tri-unsaturated fatty acids (e.g. linolenic acid, eleostearic acid), tetra-unsaturated fatty acids (e.g., stearidonic acid, and arachidonic acid), penta-unsaturated fatty acids (e.g., eicosapentaenoic acid, and clupanodonic acid), and hexa-unsaturated fatty acids (e.g., docosahexaenoic acid).

The addition amount of the organic acid is not particularly limited, but is preferably in the range of 0.01 to 1 mole with reference to 1 mole of copper atoms contained in the copper compound. The organic acid is preferably added before the reducing reaction of the copper compound, but may be added after completion of the reaction.

In the method for producing metallic nanoparticles according to the invention, the reaction step is preferably conducted at a temperature of 0 to 40° C. from the viewpoint of suppressing the coarsening of the particles. Stirring in the reaction process is preferably conducted with a stirring blade or Omnimixer from the viewpoint of the uniformity of the reaction, and the rotation speed of the stirring blade is particularly preferably 100 to 500 rpm. In the reaction step, the concentration of the copper compound is preferably 3 to 30% by mass from the viewpoint of preventing flocculation.

The metallic nanoparticles of the invention are produced by the above-described method for producing metallic nanoparticles. According to the method, the metallic nanoparticles of the invention contain therein metallic nanoparticles containing a precious metal. The metallic nanoparticles containing a precious metal may be mixed crystals in which the precious metal is mixed with copper at an atomic level, or core-shell particles composed of a precious metal core and a copper shell. The nanoparticles are particularly preferably core-shell particles.

The metallic nanoparticles of the invention are preferably composed mainly of copper. In the invention, "composed mainly of copper" means that the content of copper atoms in the metallic nanoparticles is 90% by mass or more. When the content of copper atoms is 90% by mass or more, the metallic nanoparticle dispersion containing the metallic nanoparticles of the invention is useful for forming a low-resistance conductive pattern.

Further, the average particle diameter of the metallic nanoparticles of the invention is preferably in the range of 1 to 50 nm, more preferably in the range of 2 to 30 nm, and still more preferably in the range of 3 to 20 nm. When the average particle diameter is within the range, the metallic nanoparticle dispersion containing the metallic nanoparticles of the invention is useful for forming a conductive pattern by printing or applying the dispersion on a substrate using an ink jet printer or dispenser.

The metallic nanoparticle dispersion of the invention is a dispersion in which the metallic nanoparticles of the invention are dispersed in an organic solvent. The organic solvent is preferably one of the aforementioned organic solvents.

The metallic nanoparticle dispersion of the invention may additionally contain a binder as necessary. The binder further secures the adhesion between the metallic nanoparticles and the substrate when a pattern is printed using the metallic nanoparticle dispersion of the invention or the metallic nanoparticle dispersion is applied onto a substrate.

Preferable examples of the binder include thermally polymerizable acrylic compounds (e.g., acrylic acid, methyl acrylate, isobutyl acrylate, 2-hydroxyethyl acrylate, ethylene glycol diacrylate, dipentaerythritol pentaacrylate, and ditrimethylolpropane tetraacrylate), methacrylic compounds (e.g., methacrylic acid, t-butyl methacrylate, cyclohexyl methacrylate, diethylaminoethyl methacrylate, 1,4-butanediol dimethacrylate, PEG#200 dimethacrylate, trimethylolpropane trimethacrylate, and ditrimethylolpropane tetramethacrylate), and epoxy compounds (e.g., 2-ethylhexyl diglycol glycidyl ether, ethylene glycol diglycidyl ether, propylene glycol diglycidyl ether, glycerol diglycidyl ether, and trimethylolpropane triglycidyl ether). Rosin is also preferable as the binder. Rosin is composed mainly of abietic acid, and is derived from pine resin. Rosin is classified into gum rosin, wood rosin, tall rosin, and others according to the producing method, and any of them may be used.

The addition amount of the binder is preferably 0.1 to 30 parts by mass with reference to 100 parts by mass of copper contained in the copper compound.

A method for dispersing the metallic nanoparticles in the metallic nanoparticle dispersion of invention is not particularly limited. The metallic nanoparticles of the invention may be dispersed in an organic solvent by a common method. It is particularly preferable that the copper compound be reacted with the hydrazine reducing agent in an organic solvent in the presence of a precious metal compound to make a metallic nanoparticle dispersion.

EXAMPLES

The present invention is illustrated by the following Examples, but the invention is not limited to these Examples.

Example 1

Preparation of Cuprous Oxide Nanoparticles 30.4 g of copper acetate and 1.4 g of silver acetate (5 at. % in terms of silver with reference to copper atoms in copper acetate) are dissolved in a mixed solvent of 50 mL of diethylaminoethanol and 25 mL of ethoxypropanol. To the solution, 36 mL of diethylhydroxylamine might be added. Thus, a colloid dispersion of silver-containing cuprous oxide nanoparticles is obtained.

Preparation of Copper Nanoparticles

The above-described colloidal nanoparticles of cuprous oxide are purified by centrifugation and drying, and dispersed again in a mixed solvent of octylamine/hexane (30 mL/30 mL). Sixteen mL of hydrazine monohydrate is added to the dispersion to reduce the silver-containing cuprous oxide nanoparticles to obtain a colloid dispersion of silver-containing copper nanoparticles. Hexane is readily removed by evaporation after the reducing reaction, thereby the colloid dispersion of silver-containing copper nanoparticles having a high concentration is obtained.

Example 2

A nanoparticle dispersion was produced in the same manner as in Example 1, except that the same number of moles of palladium acetate was used in place of silver acetate as the precious metal compound in the preparation of cuprous oxide nanoparticles.

Example 3

A nanoparticle dispersion was produced in the same manner as in Example 1, except that 2 mL of diethylaminoethanol was additionally added before hydrazine monohydrate was added.

Example 4

A nanoparticle dispersion was produced in the same manner as in Example 3, except that 2 mL of linolenic acid was additionally added before hydrazine monohydrate was added.

Example 5

A nanoparticle dispersion was produced in the same manner as in Example 3, except that tetradecane was added in place of octylamine before hydrazine monohydrate was added.

Example 6

A nanoparticle dispersion was produced in the same manner as in Example 1, except that 0.28 g of silver acetate (1 at. % as silver with reference to copper atoms in copper acetate) was used.

Example 7

A nanoparticle dispersion was produced in the same manner as in Example 1, except that 2.8 g of silver acetate (10 at. % as silver with reference to copper atoms in copper acetate) was added.

Comparative Example 1

A nanoparticle dispersion was produced in the same manner as in Example 1, except that no silver acetate was added in the preparation of cuprous oxide nanoparticles.

Comparative Example 2

A nanoparticle dispersion was produced in the same manner as in Example 1, except that 4.2 g of silver acetate (15 at. % as silver with reference to copper atoms in copper acetate) was added in the preparation of cuprous oxide nanoparticles.

EVALUATION

The average particle diameter of the metallic nanoparticles obtained by the above-described methods are shown in Table 1. The average particle diameter of the metallic nanoparticles was determined on the basis of the arithmetic average of the particle diameters of 500 metallic nanoparticles measured with an electron microscope under an accelerating voltage of 200 kV.

TABLE 1

| | Precious metal | Organic solvent | Organic acid | Additional compound | Average particle diameter |
|---|---|---|---|---|---|
| Example 1 | Ag(5 at. %) | Octylamine/hexane | None | None | 7 nm |
| Example 2 | Pd(5 at. %) | Octylamine/hexane | None | None | 12 nm |
| Example 3 | Ag(5 at. %) | Octylamine/hexane | None | Diethylaminoethanol | 5 nm |
| Example 4 | Ag(5 at. %) | Octylamine/hexane | Linolenic acid | Diethylaminoethanol | 4 nm |
| Example 5 | Ag(5 at. %) | Tetradecane/hexane | None | Diethylaminoethanol | 4 nm |
| Example 6 | Ag(1 at. %) | Octylamine/hexane | None | None | 13 nm |
| Example 7 | Ag(10 at. %) | Octylamine/hexane | None | None | 4 nm |
| Comparative Example 1 | None | Octylamine/hexane | None | None | 75 nm |
| Comparative Example 2 | Ag(15 at. %) | Octylamine/hexane | None | None | 87 nm |

Comparison between Example 1 and Comparative Example 1 shows that the addition of silver as precious metal remarkably decreases the average particle diameter of the obtained metallic nanoparticles. Comparison among Examples 1, 6, 7, and Comparative Example 2 shows that the diameter of the produced particles decreases as the increase of the amount of silver as the precious metal. However, as is shown by the result of Comparative Example 2, the average particle diameter increases when the amount of silver is higher than the prescribed total number of precious metal atoms in the precious metal compound because of significant flocculation.

Comparison between Example 1 and Example 2 shows that the addition of silver as the precious metal achieves a smaller average particle diameter than the addition of palladium.

The result of Example 3 shows that the addition of diethylaminoethanol, which is an alcohol compound having within the molecule thereof an amino group, further decreases the average particle diameter. Although not shown in Table, the metallic nanoparticles including diethylaminoethanol is hardly oxidized or hardly precipitates even after a lapse of three months, thereby exhibiting stable dispersibility.

The result of Example 4 shows that the addition of linolenic acid, which is an organic acid, further decreases the average particle diameter. Further, the result of Example 5 shows that the use of tetradecane, which is a non-polar solvent, as the organic solvent in place of octylamine further decreases the particle size.

Each of Examples 1 to 7 showed a two phase diffraction pattern of metallic copper and a precious metal in an X ray diffraction analysis, which indicates that they were not an alloy. In the observation of the compositional mapping by transmission electron microscopy, little elemental precious metal was found, which indicates that almost all portions of the precious metal was present in the core of the metallic nanoparticles.

All publications, patent applications, and technical standards mentioned in this specification are herein incorporated by reference to the same extent as if each individual publication, patent application, or technical standard was specifically and individually indicated to be incorporated by reference.

What is claimed is:

1. Metallic nanoparticles comprising a core and a shell surrounding the core, wherein the core comprises a precious metal selected from the group consisting of platinum, gold, silver and palladium, and the shell comprises copper, and wherein the metallic nanoparticles are produced by a method comprising reacting a copper-containing compound with a hydrazine reducing agent in an organic solvent in the presence of a precious metal compound, wherein the precious metal compound is a compound containing at least one precious metal selected from the group consisting of platinum, gold, silver, and palladium, and the total number of precious metal atoms in the precious metal compound is 1 to 10 at % of the total number of copper atoms in the copper-containing compound.

2. The metallic nanoparticles of claim 1, wherein the metallic nanoparticles are composed mainly of copper, and have an average particle diameter of from 1 to 50 nm.

3. A dispersion of metallic nanoparticles comprising the metallic nanoparticles of claim 1 and an organic solvent.

4. The dispersion of metallic nanoparticles of claim 3, wherein the metallic nanoparticles are composed mainly of copper, and have an average particle diameter of from 1 to 50 nm.

* * * * *